United States Patent

Steiner et al.

[11] Patent Number: 5,904,370
[45] Date of Patent: May 18, 1999

[54] LINING ELEMENT FOR VEHICLES

[75] Inventors: Karl Steiner, Ebergassing; Gebhard Bitterhof, Wr. Herberg; Richard Hahnekamp, Eisenstadt, all of Austria

[73] Assignee: Magna Eybl Ges. m.b.H., Ebergassing, Austria

[21] Appl. No.: 09/120,744

[22] Filed: Jul. 23, 1998

[30] Foreign Application Priority Data

Aug. 7, 1997 [AT] Austria ..................................... 1328/97

[51] Int. Cl.⁶ ................................................... B60R 21/22
[52] U.S. Cl. ..................................... 280/743.1; 280/728.1; 280/728.2; 280/730.1; 280/730.2; 280/753
[58] Field of Search ............................... 280/730.1, 730.2, 280/743.1, 728.2, 733, 748, 751, 753, 728.1

[56] References Cited

U.S. PATENT DOCUMENTS

| 5,282,648 | 2/1994 | Peterson | 280/730.1 |
| 5,322,322 | 6/1994 | Bark et al. | 280/753 |
| 5,445,430 | 8/1995 | Nichols | 280/751 |
| 5,544,913 | 8/1996 | Yamanishi et al. | 280/730.2 |
| 5,791,683 | 8/1998 | Shibata et al. | 280/730.1 |

FOREIGN PATENT DOCUMENTS

| 2306881 | 8/1974 | Germany | 280/730.1 |
| 34 22 263 | 2/1988 | Germany . | |
| 2-306849 | 12/1990 | Japan | 280/743.1 |

*Primary Examiner*—Eric D. Culbreth
*Attorney, Agent, or Firm*—Watson Cole Gringle Watson, P.L.L.C.

[57] ABSTRACT

The invention relates to a lining element for vehicles, which is designed to protect the passengers and has an essentially rigid support on which is provided an inflatable cushion, and a trim layer on the side of the support facing the interior. A simple solution is achieved by providing that the support be gas-tight and that the trim layer have a gas-tight finish and be releasably attached to a gas-tight coating over a given area.

8 Claims, 1 Drawing Sheet

LINING ELEMENT FOR VEHICLES

BACKGROUND OF THE INVENTION

The invention relates to a lining element for vehicles, which is designed to protect the passengers and comprises an essentially rigid support on which is provided an inflatable cushion, and a trim layer on the side of the support facing the interior.

DESCRIPTION OF THE PRIOR ART

To reduce the risk of injury for the occupants of a vehicle during an accident, air bags have been developed. Air bags are parts which inflate momentarily in case of a collision to absorb the impact on the vehicle passengers. As soon as the point of full inflation has been reached an air bag starts collapsing again, thus enveloping a person thrown against it and cushioning any shock.

In DE 34 22 263 c2 a safety device is described which protects vehicle passengers in a side crash, where an inflatable cover is arranged beneath a lining element of a motor vehicle. Upon inflation of the cover the lining element is blown off and the inflated cover acts as an impact-absorbing element damping any impact on an occupant and reducing the risk of injury. Such a solution is rather expensive, since provisions must be made to ensure reliable and well-defined ejection of the lining element, in particular, if the geometry of the interior is complicated, for example, in the instance of pillars curving in three dimensions or the like. The lining element itself must be rigid and may thus lead to injuries when it is blown off.

SUMMARY OF THE INVENTION

It is an object of the present invention to avoid the above disadvantages and to propose a design which is less costly than previous solutions and offers reliable protection of the vehicle passengers.

According to the invention this object is achieved by providing that the support be gas-tight and that the trim layer have a gas-tight finish and be releasably attached to a gas-tight coating over a given area.

The essential feature of the present invention is that the lining element is configured as a multilayer structure in which the trim layer itself adheres to the support in the original state. In one embodiment of the invention the trim layer is bonded to the support in a defined manner with the use of an adhesive. The bond is released when gas is injected. If the support has a substantially convex shape, adherence of the trim layer may be achieved by the elastic tension forces pressing the layer against the support. In such instances the trim layer must have sufficient elasticity to ensure that it will separate from the support when gas is blown in. In principle, the two variants could be combined into an arrangement where the trim layer is glued to the support in certain places, for example, in concavely curved areas, while it adheres to it in other parts on account of its tension. This will simplify production considerably, as the trim layer need have no natural stiffness, as is required in state-of-the-art solutions. Since the trim layer adheres to the support over the entire surface area, a handsome appearance and safe prevention of slack spots will be guaranteed.

In general, the support itself is gas-tight as it is made of appropriate plastic material. If necessary, this requirement could be fulfilled by providing the support with a suitable paint or gas-tight coating.

The solution proposed by the invention is very simple, since virtually no add-on components are needed. The absence of mechanical parts will reduce the risk of injury. Since the shape and design of the support are not subject to constructional restrictions, a number of streamlined solutions are made possible. The additional space required for the gas cartridge of an airbag module or the like is extremely small.

Another advantage of the present invention is that the simple process of inflation without the ejection of any parts will accelerate unfolding considerably. This is of special importance in the instance of side collisions, where there is hardly any time left for the release of a safety device.

It is provided in a particularly favourable variant of the invention that the trim layer should be folded over the edges of the support and be permanently connected to the support in the folded-over parts. In this way the entire surface area of the lining element may be used as a cushion, and even complex geometries may be implemented in a simple and effective manner.

In selecting the trim layer great design variety is achieved by providing the trim layer with a gas-tight backing. As an alternative, a gas-tight fabric could be applied or the trim layer itself could be made gas-tight.

The present invention is basically designed to provide impact-absorbing elements which will save the occupants of a vehicle from injury caused by being thrown against the interior structure in the course of an accident. To ensure protection in the instance of prolonged collision processes, it is provided in a preferred variant that the cushion remain inflated for several seconds. In this way the passengers are protected during a second or third crash or vehicle turnover following a first crash. The invention is not limited to this type of device, however. It is possible in principle to develop any part acting as an air bag in the manner described by the invention. In that instance a defined leak should be provided in order to enable gas to escape on impact. This will help fulfill the requirement that the impact on a person who is thrown against the air bag should be softly cushioned.

DESCRIPTION OF THE DRAWINGS

Following is a more detailed description of the invention as illustrated by the accompanying drawings, where.

The element described by the invention is configured as a support 1, which is made of thermoplastic material in a known manner and forms part of the interior trim of an automotive vehicle. The support 1 is sealed by a barrier layer configured as a gas-tight coating 2 which is bonded thereto and folded over the edges 3 of the support 1. For technical production reasons the coating 2 is provided for multilayer injection moulding.

Figure 1:
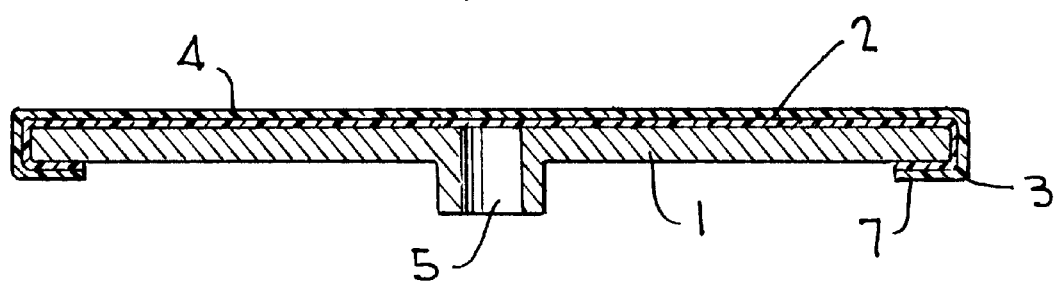
FIG. 1 is a schematical representation of a lining element of the invention in its original state.
Figure 2:
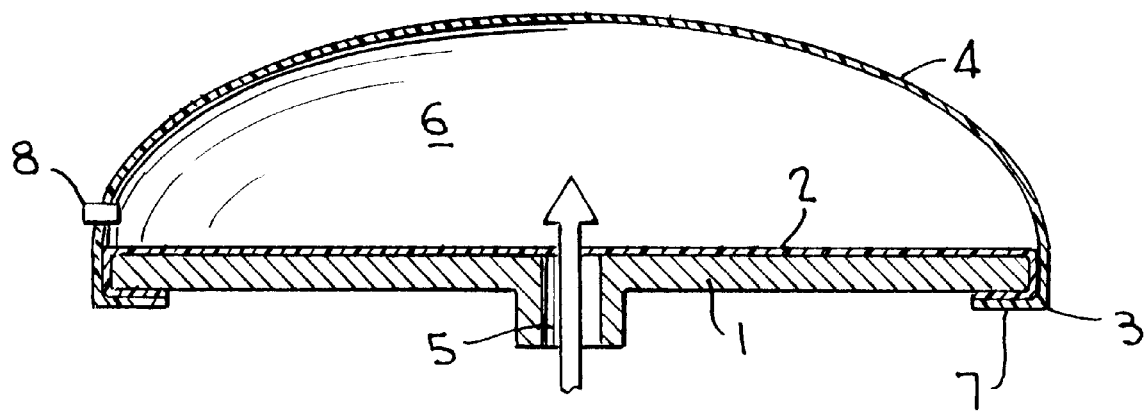
FIG. 2 shows the lining element in its inflated state.

The trim layer 4 is provided with an air-tight backing and is applied on top of the coating 2 in a defined manner, such that satisfactory bonding strength is provided under normal operating conditions. If gas from a cartridge (not shown here) is injected through a bore 5 into the space between trim layer 4 and coating 2, however, the bond is released and the trim layer is inflated, as is shown in FIG. 2. The part of the trim layer 4 which is folded over the edges of the support 1 is bonded to the rear side of the support 1 by ultrasonic welding over the entire circumference, such that a secure bond is established in this area 7. Since the inner space 6 between trim layer 4 and coating 2 is essentially gas-tight, the gas-filled cushion will remain inflated for several seconds after a crash, thus protecting the car passengers, for example during a multiple overturn.

Moreover, a defined leak as schematically shown at 8 in FIG. 2 may be provided to enable gas to escape on impact. Accordingly impact on a person thrown against the air bag should be softly cushioned.

The present invention offers a simple and effective safety device protecting the occupants of an automotive vehicle from injury in a collision.

We claim:

1. A lining element for a vehicle, which is designed to protect vehicle passengers and comprises an essentially rigid support on which is provided an inflatable cushion comprised of a trim layer on a side of the support facing an interior space of the vehicle, wherein the trim layer is gas-tight and is releasably attached to a gas-tight coating overlying a predetermined area of the support for rendering the support gas-tight.

2. The lining element as claimed in claim 1, wherein the gas-tight coating overlying the support comprises a point which is permanently connected to the support.

3. The lining element as claimed in claim 1, wherein the trim layer is provided with a gas-tight backing to render the trim layer gas-tight.

4. The lining element as claimed in claim 1, wherein a defined leak is provided in order to enable gas to escape upon impact.

5. The lining element as claimed in claim 1, wherein the trim layer is folded over edges of the support and is permanently connected to the support at the folded-over edges.

6. The lining element as claimed in claim 5, wherein the gas-tight coating overlying the support comprises a point which is permanently connected to the support.

7. The lining element as claimed in claim 5, wherein the trim layer is provided with a gas-tight backing to render the trim layer gas-tight.

8. The lining element as claimed in claim 5, wherein a defined leak is provided in order to enable gas to escape upon impact.

* * * * *